(12) United States Patent
Milazar

(10) Patent No.: US 7,530,233 B2
(45) Date of Patent: May 12, 2009

(54) GAS TURBINE AND SEALING MEANS FOR A GAS TURBINE

(75) Inventor: Mirko Milazar, Oberhausen (DE)

(73) Assignee: Siemens Aktiengesellschaft, Munich (DE)

( * ) Notice: Subject to any disclaimer, the term of this patent is extended or adjusted under 35 U.S.C. 154(b) by 252 days.

(21) Appl. No.: 10/571,500

(22) PCT Filed: Sep. 7, 2004

(86) PCT No.: PCT/EP2004/009964

§ 371 (c)(1),
(2), (4) Date: Mar. 10, 2006

(87) PCT Pub. No.: WO2005/026502

PCT Pub. Date: Mar. 24, 2005

(65) Prior Publication Data

US 2007/0025841 A1    Feb. 1, 2007

(30) Foreign Application Priority Data

Sep. 11, 2003    (EP)    ................................. 03020720

(51) Int. Cl.
*F02C 3/04* (2006.01)
*F01D 25/26* (2006.01)
(52) U.S. Cl. ........................................ 60/805; 415/134
(58) Field of Classification Search ................ 277/630, 277/637, 644, 305–307, 379
See application file for complete search history.

(56) References Cited

U.S. PATENT DOCUMENTS

| | | | |
|---|---|---|---|
| 1,073,916 A | 9/1913 | Ljunström | |
| 4,300,868 A | 11/1981 | Wilkinson et al. | |
| 5,049,032 A | 9/1991 | Brandon | |
| 5,221,096 A | 6/1993 | Heldreth et al. | |
| 6,164,656 A * | 12/2000 | Frost | 277/312 |
| 6,431,825 B1 * | 8/2002 | McLean | 415/135 |
| 6,464,232 B1 | 10/2002 | Marchi et al. | |
| 6,464,457 B1 * | 10/2002 | Morgan et al. | 415/174.2 |

FOREIGN PATENT DOCUMENTS

| | | |
|---|---|---|
| DE | 100 44 848 A1 | 2/2002 |
| EP | 0 896 128 A2 | 2/1999 |
| EP | 1 118 806 A1 | 7/2001 |
| EP | 1 323 891 A2 | 7/2003 |

* cited by examiner

*Primary Examiner*—Michael Cuff
*Assistant Examiner*—Gerald L Sung

(57) ABSTRACT

A gas turbine, with a fixed inner housing, arranged concentric to the rotor, with a through flow of working medium, is disclosed. The housing comprises at least two serial rings with an annular gap left between two directly adjacent rings, whereby an annular sealing means is arranged in at least one peripheral groove for sealing the annual gap. According to the invention, a sealing means is provided which permits a greater movement of both components forming the gap, whereby the annual gap is formed by partly overlapping rings, running against the flow direction of the working fluid in the radial sense and the front most of the two rings, in the sense of the flow direction, comprises a locating annular surface for the sealing means embodied as an annular spring element on which the spring element rests under tension such as to seal the annular gap.

17 Claims, 4 Drawing Sheets

GAS TURBINE AND SEALING MEANS FOR A GAS TURBINE

CROSS REFERENCE TO RELATED APPLICATIONS

This application is the US National Stage of International Application No. PCT/EP2004/009964, filed Sep. 7, 2004 and claims the benefit thereof. The International Application claims the benefits of European Patent application No. 03020720.3 filed Sep. 11, 2003. All of the applications are incorporated by reference herein in their entirety.

FIELD OF THE INVENTION

The invention relates to a gas turbine with a rotationally fixed inner casing which is arranged concentrically with respect to the rotor, according to the claims, and to an annular sealing means for a gas turbine, according to the claims.

BACKGROUND OF THE INVENTION

Such a gas turbine is known from EP 1 118 806 A1. A freely projecting flexural extension is provided for sealing off a gap delimited by two partially overlapping wall segments. Under thermal action, the flexural extension flexes in such a way that it closes the gap.

EP 896 128 discloses a sealing element for a gas turbine. The gas turbine has a guide blade ring consisting of adjacent turbine guide blades which form an annular hot-gas duct. Platforms are arranged on the turbine blades for the inner and outer delimitation of the hot-gas duct. Directly adjacent platforms form, with their end faces lying against one another, a gap which is sealed off by means of a sealing element. For this purpose, a groove is introduced in each case in each end face, said grooves lying opposite one another and the sealing element being inserted into them. The sealing element, of C-shaped cross section, projects in each case with one of the two bent ends into a groove in such a way that the two arms of the sealing element which extend transversely with respect to the groove bottom bear in each case against a flank of the groove and thus seal off the gap between the two adjacent platforms. The working fluid flowing in the hot-gas duct is thus prevented from leaving the duct through the gap.

Furthermore, a sealing element is known from DE 100 44 848, which seals off a gap formed between two static turbine parts. The sealing element is likewise inserted in two grooves lying opposite one another, but, in contrast to EP 896 128, has a different geometry. The action and function of this sealing element are identical to those of the abovementioned sealing element.

When the gas turbine is in operation, thermal expansions arise on the components acted upon by hot gas, such as the guide blades and their platforms, and may lead to a displacement of the components with respect to one another.

In the case of a shear displacement directed parallel to the gap, the known sealing elements allow only relatively small displacement travel.

SUMMARY OF THE INVENTION

The object of the invention is, therefore, to specify a sealing means for a gas turbine, which is effective even in the case of greater displacement travel. The object is, furthermore to specify a gas turbine appropriate for this purpose.

The object is achieved, with respect to the gas turbine, by means of the features of the claims and, with respect to the sealing means, by means of the features of the claims.

The solution for achieving the object proposes, with respect to the gas turbine, that the sealing means be designed as a spring element with a first end, with a second end and with a spring region lying between them, and that the first end be secured in one of the two rings in a circumferential groove open toward the annular gap, and that the collar arranged on the other of the two rings have, for the second end of the spring element, an annular bearing surface, against which the spring element bears, prestressed, so as to seal off the annular gap, while, in order to generate the prestress, the spring region is supported on an annular supporting surface which is provided on the collar of the one ring and which faces the annular bearing surface.

When the gas turbine is in operation, the two rings move in relation to one another on account of thermal expansions. These movements are parallel to the annular bearing surface, perpendicular thereto or a mixture of the two movements. In this case, the spring prestress causes the automatic follow-up of the spring element on the annular bearing surface, without the spring element losing contact with the annular bearing surface and the spring element thus losing the sealing action. Only the contact line is displaced in the axial direction along the annular bearing surface.

In order to generate the spring prestress, the spring element utilizes as an abutment an annular supporting surface which is arranged on the inside, facing the hot-gas duct, of the outer collar. In this case, the spring element bears at least partially between its two ends against the abutment. The sealing action can be maintained, since, as a result of the support of the spring element, the free or second end can follow especially high radial displacements, that is to say, even when the gap dimension increases appreciably, the sealing action remains maintained.

Since the spring element has an elongate configuration in cross section, a greater shear displacement, that is to say in the radial direction with respect to the rotor, of the two components in relation to one another is possible.

Advantageous embodiments are specified in the subclaims.

Expediently, the inner casing is designed to diverge conically toward the rotor in the flow direction.

A simple overlapping of the collars arranged on the adjacent rings and extending in the direction of divergence is afforded when the front wing, as seen in the flow direction, has the radially inner collar and the rear ring has the outer collar, so that, as seen radially, the annular gap runs counter to the flow direction of the working fluid. This arrangement impedes the deeper inflow of the hot gas into the gap to be sealed off, since the hot gas loses kinetic energy during penetration as a result of the reversal in flow direction brought about by a bend at right angles. The spring element is thus acted upon by the hot gas solely by a lower radially outward-directed force than the spring prestress.

For this purpose, the fixed end of the spring element is introduced as fixed bearing in a circumferential groove provided on the end face of the rear ring and can be connected, gas-tight, to the rear ring by welding or soldering. During movements, therefore, the spring element always co-moves in synchronism with the rear ring.

In a further embodiment, the annular bearing surface is provided on that side of the radially inner collar which faces away from the working fluid and therefore on the front ring. The spring element, of S-shaped cross section, can then bear sealingly as a free bearing with its free end against the annular bearing surface.

Especially advantageous is the embodiment in which, outside the inner casing, a cooling medium can flow, the pressure of said cooling medium being higher than the pressure of the working fluid inside the inner casing, and in which the spring action of the sealing means runs in the direction of the pressure drop. As a result, the spring action of the spring element is assisted by the appreciable pressure drop between the cooling medium and working fluid. The additional pressure force thus generated is dependent on the area of the spring element on which the cooling medium can act and becomes higher with a rising pressure difference. The additional pressure force leads to an improved sealing action. Even in the event that the spring prestress diminishes, a reliable bearing of the free end of the spring element against the annular bearing surface is thus ensured during operation.

The solution for achieving the object proposes, with respect to the sealing means for a gas turbine, which seals off a gap delimited by two directly adjacent components which in each case have a collar in the region of the gap and therefore partially overlap one another, that the sealing means be designed as a spring element with a first end, with a second end and with a spring region lying between them, and that the first end be secured in one of the two components in a groove open toward the gap, and that the collar arranged on the other of the two components have, for the second end of the spring element, a bearing surface against which the spring element bears, prestressed, so as to seal off the gap, while, in order to generate the prestress, the spring region is supported on a supporting surface which is provided on the collar of the one component and which faces the bearing surface.

BRIEF DESCRIPTION OF THE DRAWINGS

The advantages described with regard to the gas turbine in this case also apply accordingly to the sealing means.

The invention is explained by means of drawings in which.

DETAILED DESCRIPTION OF THE INVENTION

Figure 2:
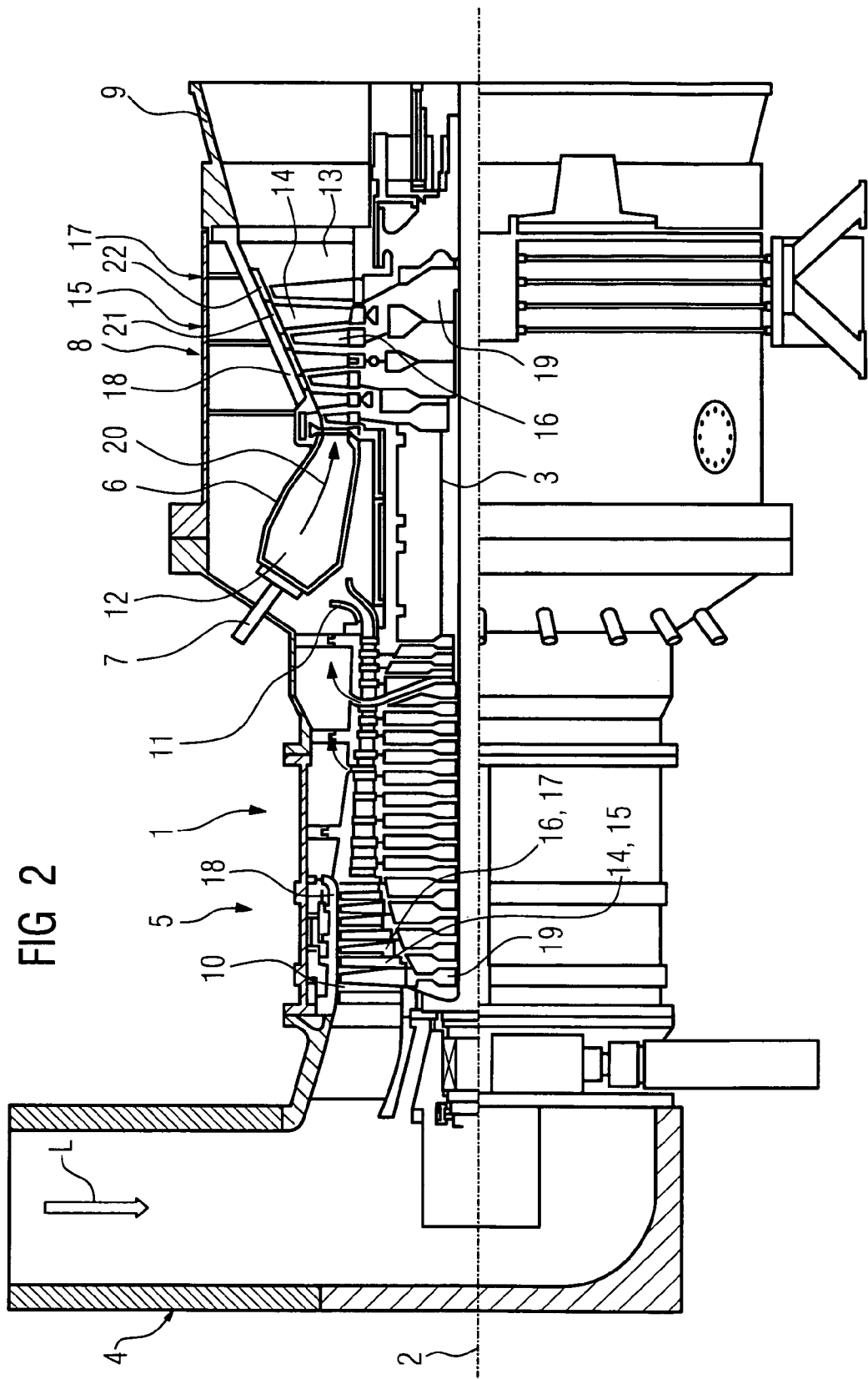
FIG. 2 shows a part longitudinal section through a gas turbine.

FIG. 2 shows a gas turbine 1 in a part longitudinal section. It has, inside it, a rotor 3 which is rotationally mounted about an axis of rotation 2 and which is also designated as a turbine rotor or rotor shaft. An intake casing 4, a compressor 5, a toroidal annular combustion chamber 6 with a plurality of coaxially arranged burners 7, a turbine 8 and an exhaust gas casing 9 succeed one another along the rotor 3.

In the compressor 5, an annular compressor duct 10 is provided, which narrows in cross section in the direction of the annular combustion chamber 6. At the outlet, on the combustion chamber side, of the compressor 5, a diffuser 11 is arranged, which is flow-connected to the annular combustion chamber 6. The annular combustion chamber 6 forms a combustion space 12 for a mixture consisting of a fuel and of compressed air. A hot-gas duct 13 is flow-connected to the combustion space 12, the hot-gas duct 13 being followed by the exhaust gas casing 9.

Blade rings are in each case arranged alternately in the compressor duct 10 and in the hot-gas duct 13. A guide blade ring 15 formed from guide blades 14 is followed in each case by a moving blade ring 17 formed from moving blades 16. The fixed guide blades 14 are in this case connected to a guide blade carrier 18, whereas the moving blades 16 are connected to the rotor 3 by means of a disk 19.

The guide blades 14 are fastened to the guide blade carrier 18 and at their end facing the guide blade carrier 18 have platforms 21 which outwardly delimit the hot-gas duct 13. Arranged adjacently to the platforms 21 of the guide blades 14 in the flow direction are guide rings 22 which lie opposite the tips of the moving blades 16 and which delimit the hot-gas duct 13. The platforms 21 of the individual guide blades 14 of a guide blade ring 15 in this case form a ring 25 which is adjacent to the guide ring 22 consisting of segments and between which an annular gap 23 is enclosed. The guide ring 22 and the platform ring in this case form an inner casing 37 for the working fluid 20 flowing through the rings.

While the gas turbine 1 is in operation, air 21 is sucked in by the compressor 5 through the intake casing 4 and is compressed in the compressor duct 10. Air L provided at the burner-side end of the compressor 5 is led through the diffuser 11 to the burners 7 and is mixed there with a fuel. The mixture is then burnt in the combustion space 10 so as to form a working fluid 20. The working fluid 20 flows from there into the hot-gas duct 13. At the guide blades 14 arranged in the turbine 8 and at the moving blades 16, the working fluid 20 expands so as to transmit pulses, so that the rotor 3 is driven and, with it, a working machine (not illustrated) coupled to it.

Figure 1:
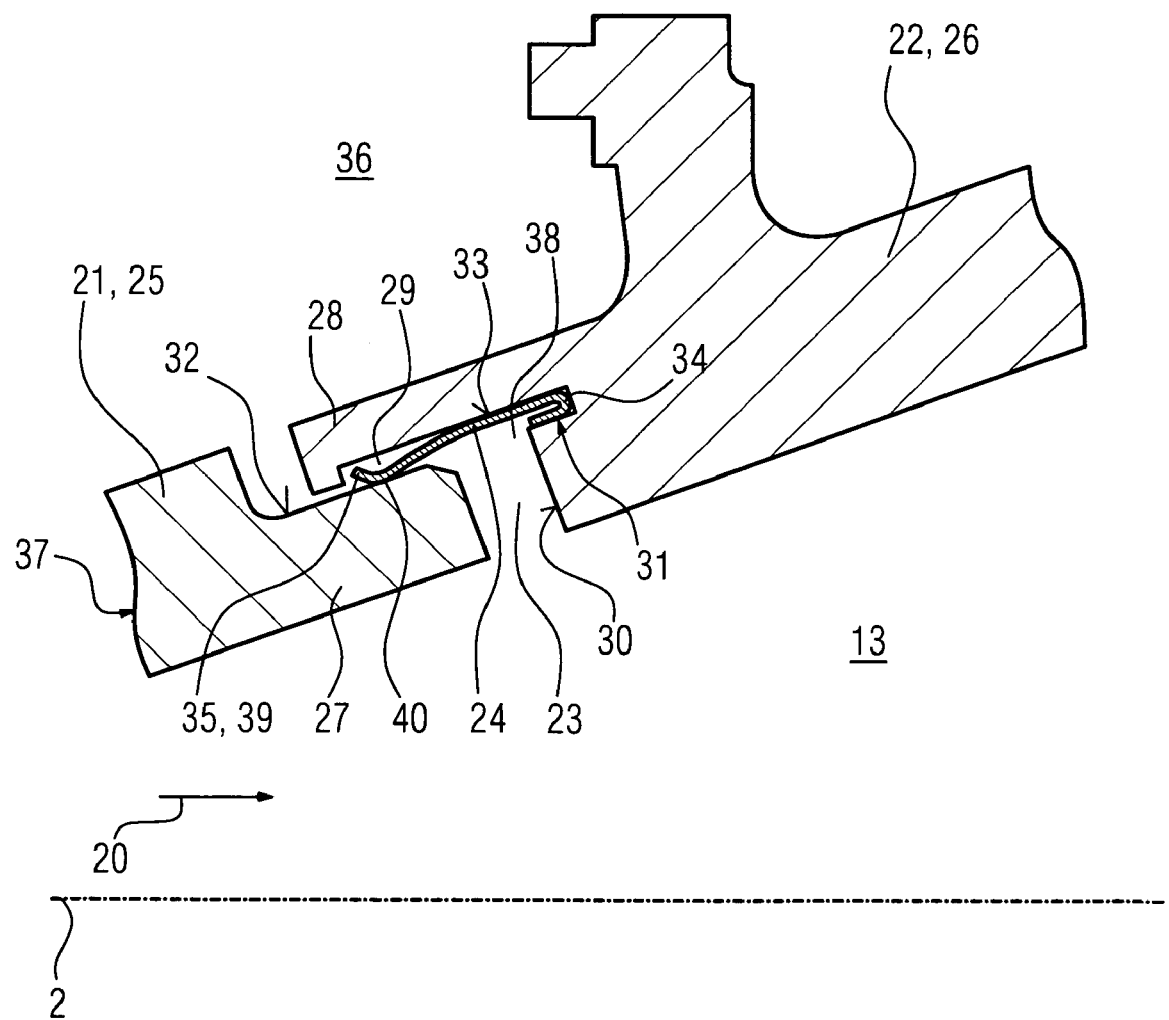
FIG. 1 shows an annular gap with a sealing means.

FIG. 1 shows a detail of the gas turbine 1 with a gap, for example an annular gap 23. The annular gap 23 is in this case formed between a first component, the platform 21 of the guide blade 14, and a second component, the guide ring 22. FIG. 1 illustrates only the components essential to the invention, that is to say the illustration of guide blades 14 and moving blades 16 and of the fastening of the guide ring 22 and of the platform 21 is dispensed with.

As seen in the flow direction of the working fluid 20, the platforms 21 form the front ring 25 and the guide ring 22 forms the rear ring 26. The front ring 25 has integrally formed on it, radially on the inside, a first collar 27 which extends in the direction of the following rear ring 26 along the conical run of the hot-gas duct 13. The rear ring 26 has integrally formed on it, radially on the outside, a further collar 28 which overlaps the first collar 27, as seen radially from the inside outward, so that the annular gap 23 is formed in cross section as an overlap gap. An overlap gap, in which the radially outer collar 28 is arranged on the front ring 25 and the inner collar 27 is arranged on the rear ring 26, would, of course, also be possible.

Along the annular gap 23, as seen from the inside outward, the latter first has a gap portion which runs in the radial direction and which is deflected in a bend 38 by the outer collar 28, so that said gap portion has adjoining it in the axial direction a gap portion 29 which extends counter to the flow direction of the working fluid 20. A second bend then occurs, which deflects the annular gap 23 into the radial direction again.

An annular bearing surface 32 is arranged on that side of the first collar 27 which faces away from the working fluid 20. The annular supporting surface 33 is located, opposite the annular bearing surface 32, on the outer collar 28.

A groove, preferably a circumferential groove 31, is provided in that end face 30 of the rear ring 26 which faces the front ring 25.

The first end 34 of the spring element 24 is crimped and inserted into the circumferential groove 31. In this case, the circumferential groove 31 may be somewhat smaller in its width than double the material thickness of the spring element 24, in order to achieve an effectively bearing and reliable connection to the rear ring 26. The spring element 24 may likewise be soldered or welded in the circumferential groove 31 to the rear ring 26.

The first end 34 of the spring element 24 has adjoining it, in cross section, a spring region which runs in a slightly convex arc and which is supported on the annular supporting surface 33. A prestress in the spring element 34 is thereby generated which is directed in the direction of the annular bearing surface 32.

The convex arc, that is to say the spring region of the spring element 24, has adjoining it a free second end 35 formed by a concave arc 39. In order to achieve a good displaceability of the second end 35 on the annular bearing surface 32, the concave arc 39 of the spring element 24 bears, air-tight, against the annular bearing surface 32 along a contact line 40 directed in the circumferential direction.

A rear space 36 separated from the hot-gas duct 13 by the rings 25, 26 is separated, air-tight, from the hot-gas duct 13 by means of the spring element 24 which bears against the two rings 25, 26 and is likewise designed as a ring consisting of segments.

In order to cool the rings 25, 26 or ring segments acted upon by the hot working fluid 20, in the rear space 36 a cooling fluid flows, the pressure of which is higher than that of the working fluid 20. The prestress of the spring element 24 is assisted by the force generated by the pressure drop, so that the spring element 24 is pressed even more firmly against the annular bearing surface 32. A low cooling fluid outflow as a result of positional deviations, not to be ruled out, between individual segments of a ring or as a result of a surface roughness of the annular bearing surface 32 serves for cooling the spring element 24.

The spring element 24 may in this case be produced from a heat-resistant alloy, for example from an alloy bearing the tradename of Nimonic 90.

Figure 3:
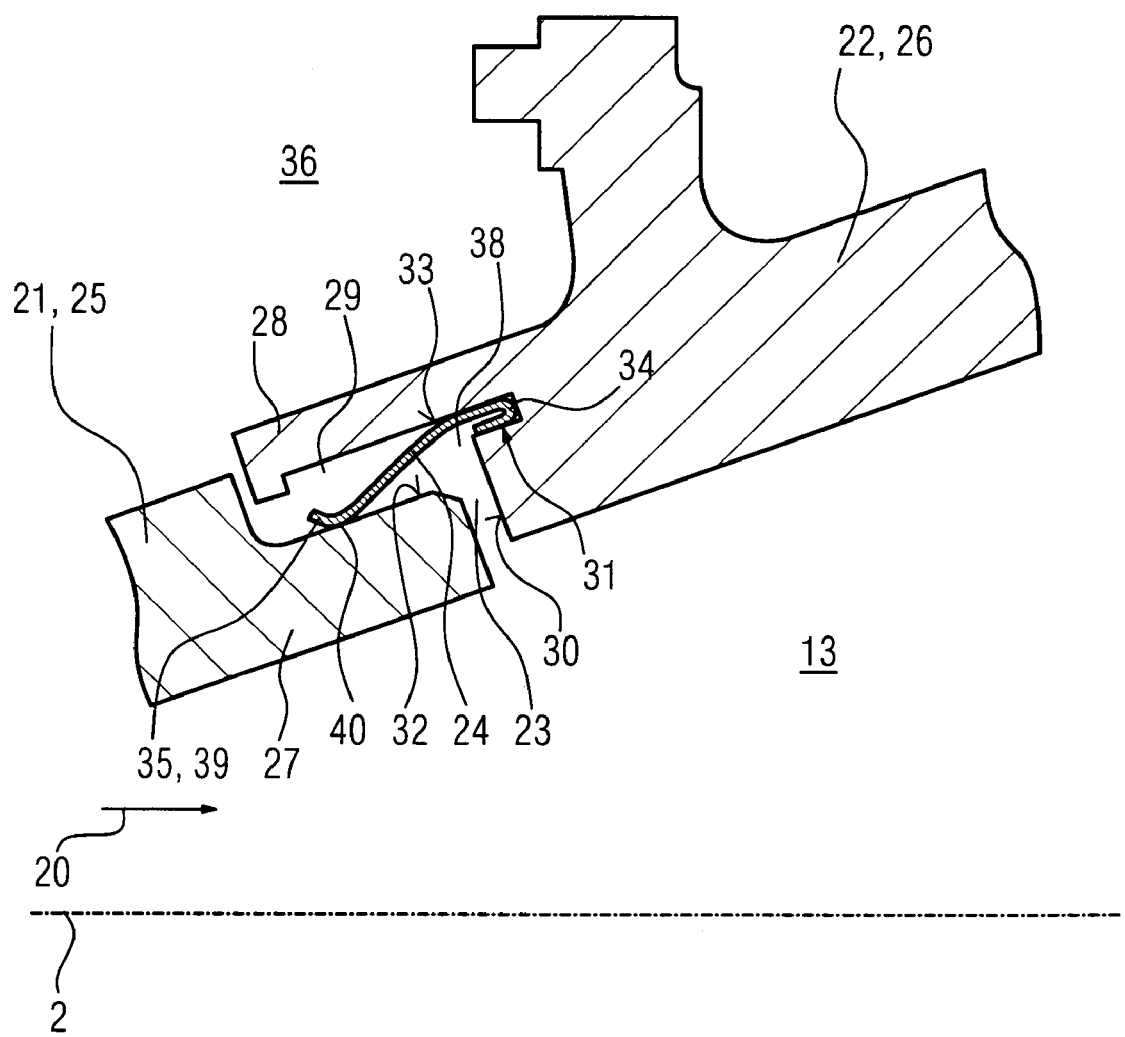
FIG. 3 shows the annular gap according to FIG. 1 with offset rings.

FIG. 3 shows the two rings 25, 26 in a position displaced in relation to one another after thermal expansion has taken place. In respect of FIG. 1, the length of the gap portion 29 is shortened, as seen in the flow direction of the working fluid 20, but the distance between the two collars 27, 28 or the distance of the annular bearing surface 32 from the annular supporting surface 33 has increased, as compared with FIG. 1. As regards the rotor 3, the two rings 25, 26 forming the annular gap 23 are displaced in relation to one another both in the radial direction and in the axial direction.

Figure 4:
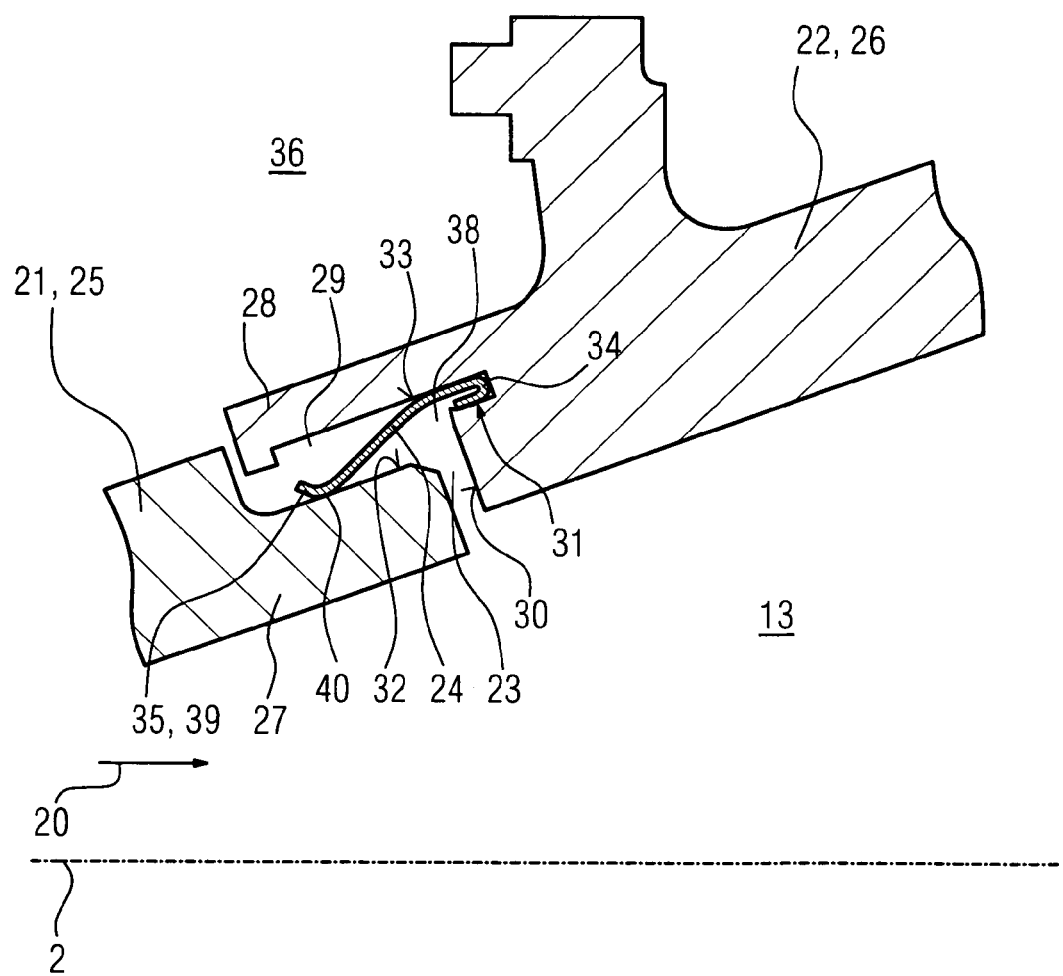
FIG. 4 shows the annular gap according to FIG. 3 after calking of the circumferential groove.

Alternatively to FIG. 3, FIG. 4 shows a spring element 24 clamped in the manner of a joint as a result of the calking of the circumferential groove 31, so that there is a slight movability of the spring element 24 in the manner of a hinge.

By virtue of the spring prestress, the free end 35 of the spring element 24 remains in contact with the annular bearing surface 32 in spite of the high displacement travel and thus seals off the rear space 36 with respect to the hot-gas path 13. Slight leakage streams of cooling fluid through the annular gap 23 into the hot-gas duct are in this case possible, and, as compared with the prior art, an improvement in the sealing action and a reduction in leakage are furthermore achieved.

Owing to the annular arrangement of the platforms 21 and guide rings 22 and due to the radial mounting required for these components, the platforms 21 described in the description and claims, the guide blade rings 15, the rings 22, 25, 26 and also the spring elements 24 are in each case to be understood as meaning only segments of the respective ring.

Furthermore, the sealing means proposed may be used both between adjacent platforms of an individual blade ring and in other regions of the gas turbine, for example in the combustion chamber, when an overlap gap is formed between the components to be sealed off.

The invention claimed is:

1. A gas turbine engine, comprising:
a rotationally mounted rotor having a longitudinal axis;
an axial compressor arranged coaxially along the rotor that produces a compressed intake fluid flow;
a combustion chamber arranged downstream of the compressor which receives the fluid flow and a fuel, and combusts the fluid flow and the fuel to form a hot working medium flow;
a turbine that receives and extracts mechanical energy from the hot working medium flow;
a rotationally fixed inner casing wherein the hot working medium flows through a passage within the inner casing, the inner casing comprising:
a front ring having a collar portion extending in the axial direction arranged coaxially with the rotor, and
a rear ring having a collar portion extending in the axial direction arranged coaxially and down stream of the front ring with respect to the direction of flow of the working medium, the front and rear rings forming an annular gap in an area where the collars partially overlap, and
a single element spring arranged to seal the annular gap from the hot working medium having a first end, a radially free second end and a spring region arranged between the first and second ends, the first end secured in a circumferential groove of either the front ring or the rear ring and the second end in intimate contact with a bearing surface of the collar of the other inner casing ring sealing the annular gap from the hot working medium such that the second end accommodates both radial and axial relative motions between the front and rear rings, wherein a width of the circumferential groove is smaller than a width of the spring element first end to provide a secure and sole retention of the spring element in the circumferential groove due to an interference between the spring element first end and the circumferential groove.

2. The engine as claimed in claim 1, wherein the inner casing diverges conically toward the rotor in the direction of flow.

3. The engine as claimed in claim 1, wherein the front ring has a radially inner collar and the rear ring has a radially outer collar.

4. The engine as claimed in claim 3, wherein the front ring forms the radially outer collar and the rear ring forms the radially inner collar such that the annular gap extends in the direction of flow of the working fluid.

5. The engine as claimed in claim 1, wherein the radial width of the circumferential groove is less than twice the material thickness of the spring seal.

6. The engine as claimed in claim 5, wherein the first end of the spring element is connected to the circumferential groove by welding or soldering.

7. The engine as claimed in claim 1, wherein an annular bearing surface is provided on the radially inner collar on a side opposite the working medium.

8. The engine as claimed in claim 1, wherein the spring seal element has a S-shaped cross section.

9. The engine as claimed in claim 1, wherein a cooling medium exerts a higher pressure on an outer diameter surface of the spring seal element relative to the pressure exerted on the inner diameter side by the hot working medium.

10. A gas turbine hot gas sealing system comprising:

a first component having a collar portion;

a second component having a collar portion adjacent the first component collar portion, the first and second collar portions partially overlapping to form an annular gap, the second component having a circumferential groove open to the annular gap; and an annular single element spring seal arranged to seal the annular gap from a hot gas in the turbine having a first end, a radially free second end and a spring region arranged between the first and second ends, the first end region secured within the circumferential groove and the second end in direct contact with the collar of the first inner casing ring sealing the annular gap from the hot gas such that the second end accommodates both radial and axial relative motions between the first and second components, wherein a width of the circumferential groove is smaller than a width of the spring seal element first end to provide a secure and sole retention of the spring seal element in the circumferential groove once the spring element first end is inserted into the circumferential groove due to an interference between the spring element first end and the circumferential groove.

11. The sealing system as claimed in claim 10, wherein the circumferential groove is facing the annular gap.

12. The sealing system as claimed in claim 10, wherein the first end of the spring element is welded or soldered to the circumferential groove.

13. The sealing system as claimed in claim 10, wherein the spring element has an S-shaped cross section.

14. A compliant turbine hot gas seal system, comprising:

a first hot gas component having an annular surface concentric with a centerline of the turbine;

a second hot gas component having a recessed surface arranged proximal and concentric to the annular surface of the first component defining a hot gas gap between the first and second components; and a single element seal component having a first, a radially free second and a third portion, the first portion arranged within the recess, the radially free second portion in sliding contact with the annular surface and the third portion arranged between the first and second portions where the third portion is a spring section and where the second portion accommodates both radial and axial relative motions between the first and second hot gas components, wherein the seal component is pre-stressed in the radial direction and exerts a contact pressure against the annular surface to prevent a flow of hot gas through the hot gas gap, wherein a width of the recess is smaller than a width of the seal component first portion to provide a secure and sole retention of the seal component in the recess once the seal component first end is inserted into the recess due to an interference between the seal component first end and the recess.

15. The seal system as claimed in claim 14, wherein the first portion is welded or soldered to the second component.

16. The seal system as claimed in claim 14, wherein the seal component is S-shaped.

17. The seal system as claimed in claim 14, wherein the seal accommodates radial and axial relative motion between the first and second components.

* * * * *